Oct. 30, 1951 — O. E. WATSON — 2,573,075
SELF-ALIGNING BORE GAUGE
Filed Dec. 4, 1946
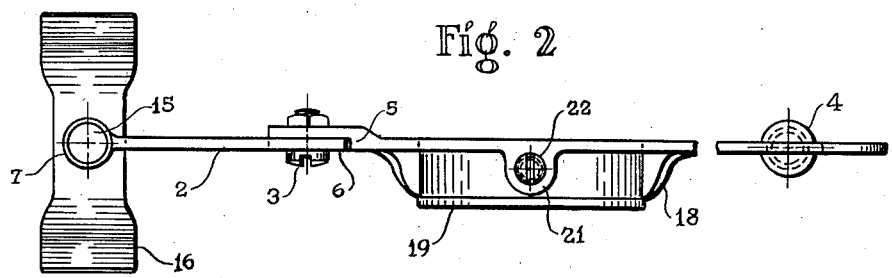
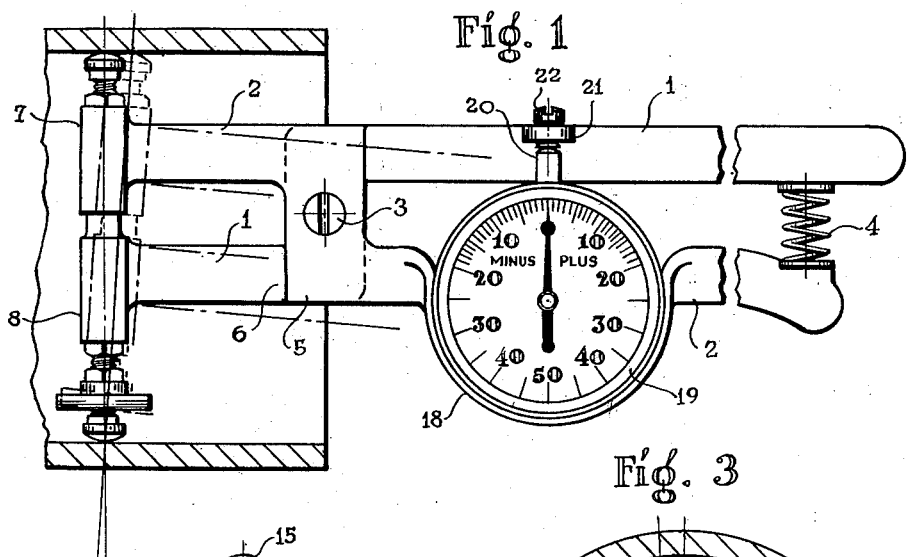
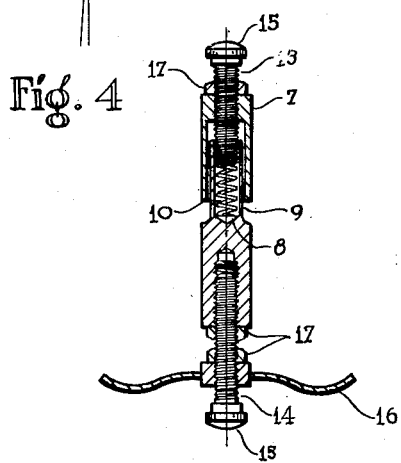
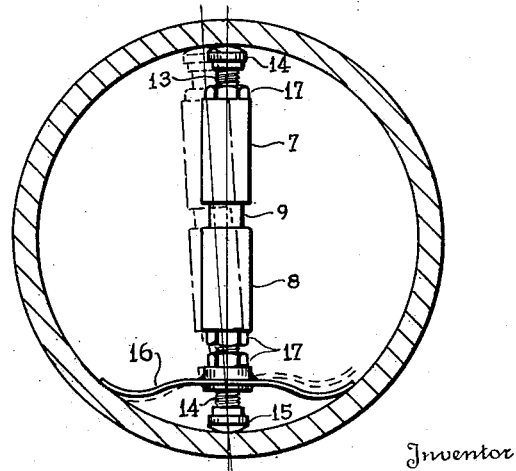
Inventor
Oliver E. Watson
By F. L. Walker
Attorney Patented Oct. 30, 1951

2,573,075

UNITED STATES PATENT OFFICE 2,573,075

SELF-ALIGNING BORE GAUGE

Oliver E. Watson, Dayton, Ohio, assignor of one-half to Bert F. Downey, Springfield, Ohio; Anna T. Shonk, administratrix of said Oliver E. Watson, deceased, assignor of one-half to Elva Watson, Dayton, Ohio Application December 4, 1946, Serial No. 714,062

8 Claims. (Cl. 33—178)

This invention pertains to measuring instruments, and particularly to an indicating caliper, especially adapted to assure that interior measurements of a circular opening or pipe section are taken perpendicularly to the longitudinal axis thereof.

In taking measurements of interior dimensions, it is possible that the instrument or caliper may be tilted in either transverse or axial direction out of a true diametrical position, and thus be caused to afford a false reading. In the present instance the gage or caliper is provided with a spring foot, or resilient outrigger arms which tend to automatically restore the critical measuring points of the instrument to a true diametrical alignment.

The object of the invention is to improve the construction as well as the means and mode of operation of inside calipers, whereby they may not only be economically manufactured, but will be more efficient in use, automatic in operation, uniform in action, possess a relative few operating parts, and be unlikely to get out of repair.

A further object is to improve the accuracy of measurements made by such instrument, enable quick application of the instrument in its proper position, and enable rapid operation thereof.

A further and important object of the invention is to provide means for supporting the instrument in position for taking a true measurement, and for automatically adjusting the instrument into such position if carelessly positioned or accidentally moved therefrom.

A further object of the invention is to provide a measuring instrument, possessing the advantageous structural features and inherent meritorious characteristics and mode of operation herein described, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawings, wherein is illustrated the preferred, but obviously not necessarily the only form of embodiment thereof, Fig. 1 is a side elevation of an indicating inside caliper, applied to a work piece, embodying the present invention.

Fig. 2 is a top plan view thereof.

Fig. 3 is an end elevation of the assembled instrument, applied to the work piece.

Fig. 4 is a detail longitudinal sectional view, of the cooperating heads of the instrument.

Like parts are indicated by similar characters of reference throughout the several views.

The instant measuring instrument frame comprises a pair of interpivoted substantially Z shaped offset levers 1 and 2 pivotally connected at 3 for relative oscillation against the yielding resistance of an expansion spring 4. One lever is provided with a shoulder or stop 5 engaged by an offset portion 6 of the other lever, to limit the oscillatory approach of the arms 1 and 2, under expansive influence of the spring 4.

One of the interpivoted arms, which might be either, carries as a part thereof a cylindrical tubular head 7. The other arm carries as a part thereof a head 8 having an integral plunger 9 telescopically extending within the tubular head 7 for reciprocatory motion therein as the levers 1 and 2 are actuated. The reciprocatory engagement of the heads 7 and 8 maintains the heads in axial alignment and guides the movement of the heads within very limited range. In the present instance the plunger 9 is shown to be hollow or tubular and confines therein a helical expansion spring 10 which reacts against the heads 7 and 8, normally tending in cooperation with spring 4 to maintain the heads in relative expanded relation. The heads 7 and 8 carry adjustable screw studs 13 and 14, each having a contact head 15 engageable with the interior wall of the space to be measured. As before indicated the instrument is adapted to measurement of circular recesses, but is not necessarily limited thereto. It may be utilized to measure the intermediate space between any opposed surfaces. To secure a true and accurate measurement, it is necessary that the measurement be taken on a diametrical plane perpendicular to the general axis of the recess. The instrument should not be tilted either transversely nor longitudinally. To automatically position the instrument relative to the recess being measured, there is attached to the head 8 a comparatively broad resilient foot or cross arm 16, the ends of which engage the arcuate side walls of the recess as a chord, to which the axis of the heads 7 and 8 and the opposed contact studs 13—14 carried thereby is perpendicular.

If the instrument is inserted within a circular recess in a laterally tilted position as shown by dotted lines in Fig. 3 with only one end of the foot or cross arm in contact with the circular wall of the recess seeking uniform support will tend to oscillate the instrument into the solid line position wherein the common axis of the contact studs 13 and 14 coincides with a true diameter of the recess. To the contrary, if the instrument is careleslly positioned in an askew or tilted position as shown by dotted lines in Fig. 1, the resilient foot or cross arm 16 will then rest upon one lateral edge thereof, and the reactance of the compressed springs 4 and 16 will tend to turn the instrument into firm footing on the wall of the recess, thus urging the common axis of the heads 7 and 8, and the contact studs 13—14 into perpendicular relation with the axis of the recess, as shown by solid lines.

The adjustable contact studs 13—14 are secured in their adjusted positions by lock nuts 17 thereon engaging the respective heads 7 and 8. Mounted in a bight 18 of the lever 2 is a conventional dial type indicator 19 actuated by a depressible plunger 20 to indicate upon the dial of the indicator 19 the plus or minus deviation of the interior measurement of the recess, determined by the over all relation of the spaced contacts 15 with an established dimension of a master gage. The dial of the conventional indicator 19 is revoluble to enable the dial reading to be initially set to zero with the contact faces 15 positioned in agreement with the master gage. Thereafter upon applying the instrument to different pieces of work the indicator dial will show the degree of oversize or undersize by the deviation of the pointer from its zero position, in one direction or the other. The reciprocation of the gage actuating plunger 20 is controlled by a lug 21 upon the lever 1. The lug 21 is preferably, but not necessarily provided with an adjustable contact stud 22, to enable correction of slight errors in operative relation of the lever and plunger.

From the above description it will be apparent that there is thus provided a device of the character described possessing the particular features of advantage before enumerated as desirable, but which obviously is susceptible of modification in its form, detail construction and arrangement of parts without departing form the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An indicating caliper, including a pair of parallel interpivoted oscillatory arms, aligned telescopic heads carried thereby, adjustable contact portions carried by each head for longitudinal adjustment relative thereto, a measurement indicator carried by one of the arms, and energized by relative motion of the other arm to automatically indicate fluctuations of the intervening distance between the contact portions, and a spring cross arm carried by one of the contact portions and extending in opposite directions beyond the common axis of the aligned heads and contact portions into engagement with a work piece being measured, to position the caliper with the common axis of its contact portions in predetermined relation with the work piece.

2. A measuring caliper, including a pair of interpivoted oscillatory levers, aligned telescopic contact portions on the respective levers, a measurement indicator carried by one of the levers and actuated by relative oscillation of the other lever to automatically indicate the approach and recession of the relatively aligned contact portions of the respective levers, and resilient supports carried by one of the contact portions extending on opposite sides of the common axis of the contact portions engageable with a work piece being measured to assure the positioning of the caliper with the common axis of the contact portions in perpendicular relation with the work piece being measured.

3. An indicating caliper, including a pair of interpivoted oscillatory levers, a pair of cooperating springs interposed between opposite ends of said levers normally urging said levers toward expanded position, a pair of axially aligned contact members carried by the levers and engageable with opposite surfaces of a work piece, a dial type indicator carried by one of the levers, and actuated by relative oscillatory motion of the other lever, and an arm carried by one of the levers in transverse relation with the common axis of the contact members and engageable with the work piece at opposite sides thereof to automatically align said common axis in perpendicular relation with the work piece being measured under expansive influence of the pair of cooperating springs.

4. A measuring instrument, including a pair of interpivoted oscillatory levers, interengaged heads maintaining the extremities of the levers in alignment, a pair of aligned variably spaced contacts carried by said heads, an indicator carried by one of the levers and actuated by relative motion of the other lever to automatically indicate fluctuations of the variable spaced relation of the contacts, and a resilient foot carried by one of the levers and projecting on opposite sides of the common axis of the spaced contacts tending to urge the instrument into a position wherein the common axis of the contacts is in perpendicular relation to an object engaged by at least one of said rests and resisting its movement therefrom.

5. A measuring caliper, including a pair of interpivoted oscillatory levers, a pair of aligned contact portions carried thereby, and a spring cross arm adjustably mounted on one of said contact portions and disposed in transverse relation with the common axis of the contact portions for engagement with the work piece to position the axis of the contact portions in predetermined relation with the work piece to be measured.

6. An indicating caliper, wherein a dial type indicator is actuated by relative adjustment of a pair of interpivoted levers, including axially aligned telescopic contact members carried by the interpivoted levers, and engageable with opposite surfaces of a work piece to be measured, and oppositely extending spring arms carried by one of the levers in transverse relation to the common axis of the contact members and engageable with the work at opposite sides of the common axis to position said axis in predetermined relation with the work piece, the measurement intermediate the points of engagement of the contacts with the work piece being automatically indicated by said indicator.

7. An indicating inside caliper gage, including a pair of interpivoted layers, telescopically interengaging heads carried thereby, a pair of oppositely directed axially aligned contact members carried by the heads for engagement with opposite interior walls of a recess in a work piece being measured, resilient outrigger arms carried by one of the heads engageable with the interior surface of the recess at opposite sides of the axis of the contacts to assure adjustment of the gage to position wherein the common axis of the contact members occupies a predetermined relation to the work piece.

8. A measuring instrument, including a pair of interpivoted levers, telescopically adjustable heads carried thereby, a pair of oppositely directed axially aligned contact members carried by the heads engageable with spaced surfaces of a work piece to be measured, and transversely disposed spring biased outrigger arms carried by one of the heads and engageable with the work piece at opposite sides thereof locating the common axis of the pair of contact members.

OLIVER E. WATSON.

REFERENCES CITED

The following references are of record in the file of this patent:

UNITED STATES PATENTS

| Number | Name | Date |
|---|---|---|
| 611,391 | Pike | Sept. 27, 1898 |
| 1,274,331 | Rockwell | July 30, 1918 |
| 1,462,130 | Beard | July 17, 1923 |
| 1,625,401 | Simpson | Apr. 19, 1927 |
| 1,625,766 | Simpson | Apr. 19, 1927 |
| 1,644,967 | Wettrich | Oct. 11, 1927 |
| 1,816,464 | Biggert | July 18, 1931 |
| 2,337,509 | Todd | Dec. 21, 1943 |

FOREIGN PATENTS

| Number | Country | Date |
|---|---|---|
| 238,163 | Switzerland | Oct. 1, 1945 |